US010696118B2

(12) United States Patent
Bratton et al.

(10) Patent No.: US 10,696,118 B2
(45) Date of Patent: Jun. 30, 2020

(54) RADIAL CONVEYOR WITH MULTI-MODE WHEEL ASSEMBLY

(71) Applicant: TEREX GB LIMITED, County Tyrone (IE)

(72) Inventors: Terence Bratton, County Tyrone (IE); Mark Mawhinney, Dungannon (IE)

(73) Assignee: Terex GB Limited, County Tyrone (IE)

( * ) Notice: Subject to any disclaimer, the term of this patent is extended or adjusted under 35 U.S.C. 154(b) by 0 days.

(21) Appl. No.: 15/989,610

(22) Filed: May 25, 2018

(65) Prior Publication Data

US 2018/0339564 A1 Nov. 29, 2018

(30) Foreign Application Priority Data

May 26, 2017 (GB) .................................. 1708479.9

(51) Int. Cl.
*B60G 17/00* (2006.01)
*B65G 41/00* (2006.01)
*B60S 9/02* (2006.01)

(52) U.S. Cl.
CPC ................ *B60G 17/00* (2013.01); *B60S 9/02* (2013.01); *B65G 41/001* (2013.01); *B65G 41/008* (2013.01); *B60G 2500/30* (2013.01); *B65G 2207/08* (2013.01)

(58) Field of Classification Search
CPC ............................ B65G 41/001; B65G 41/008
USPC .................................. 198/300, 302, 306, 313
See application file for complete search history.

(56) References Cited

U.S. PATENT DOCUMENTS

| 3,973,754 | A | 8/1976 | Chadwick, Jr. | |
|---|---|---|---|---|
| 5,515,961 | A | 5/1996 | Murphy et al. | |
| 5,833,043 | A | 11/1998 | Schmidgall et al. | |
| 6,929,113 | B1 * | 8/2005 | Hoover | B65G 21/14 198/313 |
| 8,584,826 | B2 * | 11/2013 | Smith | B65G 41/008 198/302 |

(Continued)

FOREIGN PATENT DOCUMENTS

| CN | 104973126 A | 10/2015 |
|---|---|---|
| DE | 202008015729 U1 | 4/2010 |

(Continued)

OTHER PUBLICATIONS

IPO Search Report dated Nov. 23, 2017, for corresponding Application No. GB1708479.9; Filing Date: May 26, 2017 consisting of 1-page.

(Continued)

*Primary Examiner* — William R Harp
(74) *Attorney, Agent, or Firm* — Christopher & Weisberg, P.A.

(57) ABSTRACT

A radial conveyor has a multi-mode wheel assembly located at each side of its chassis. Each wheel assembly is movable with respect to the chassis between a non-deployed state and a deployed state. In the non-deployed state the wheel assemblies support transport of the radial conveyor. In the deployed state the wheel assemblies support radial movement of the conveyor. The wheel assemblies can also be raised and lowered with respect to the chassis. This allows the ground clearance of the chassis, and the overall height of the radial conveyor to be adjusted, as well as facilitating transition between operating modes.

21 Claims, 5 Drawing Sheets

(56) References Cited

U.S. PATENT DOCUMENTS

| | | |
|---|---|---|
| 10,011,443 B2 * | 7/2018 | McCloskey .......... B65G 41/008 |
| 2007/0101897 A1 | 5/2007 | Stevick et al. |
| 2013/0092506 A1 | 4/2013 | Smith |

FOREIGN PATENT DOCUMENTS

| | | |
|---|---|---|
| FR | 2292408 A7 | 6/1976 |
| GB | 294909 A | 7/1928 |
| WO | 2011151378 A1 | 12/2011 |
| WO | 2017027605 A1 | 2/2017 |

OTHER PUBLICATIONS

European Search Report dated Oct. 17, 2018, for corresponding Application No. EP20180173706; Filing Date: May 22, 2018 consisting of 2-pages.

* cited by examiner

RADIAL CONVEYOR WITH MULTI-MODE WHEEL ASSEMBLY

CROSS-REFERENCE TO RELATED APPLICATION

This application is related to and claims priority to Great Britain Patent Number 1708479.9, filed May 26, 2017, the entirety of which is incorporated herein by reference.

STATEMENT REGARDING FEDERALLY SPONSORED RESEARCH OR DEVELOPMENT n/a

TECHNICAL FIELD

The present invention relates to a method and system for radial conveyors.

INTRODUCTION

Radial conveyors comprise a conveyor mounted on a wheeled support structure wherein the wheels are configured to allow the conveyor to move in a radial, or arc-like, manner about a center point. Some radial conveyors include a second set of wheels to facilitate transport of the conveyor. The provision of two sets of wheels increases the cost and complexity of the conveyor.

It would be desirable to provide an improved radial conveyor.

SUMMARY

The present invention advantageously provides a method and system for a radial conveyor apparatus. In one embodiment, a radial conveyer apparatus comprises: a chassis having a longitudinal axis; a conveyor supported on the chassis; at least one wheel assembly coupled to the chassis, the or each wheel assembly comprising at least one wheel coupled to a wheel support structure for rotation about a rotational axis, the at least one wheel assembly is movable with respect to the chassis between a non-deployed state, in which the rotational axis is perpendicular with the longitudinal axis of the chassis, and a deployed state in which the rotational axis is radially displaced with respect to the longitudinal axis; and the at least one wheel assembly is operable to raise and lower the at least one wheel with respect to the chassis.

In one aspect of the embodiment, the at least one wheel assembly is pivotably coupled to the chassis for pivoting movement between the deployed and non-deployed states.

In one aspect of the embodiment, the at least one wheel assembly is pivotably coupled to the chassis for pivoting movement between the deployed and non-deployed states about an axis that is, in-use, perpendicular with a ground surface on which the radial conveyor apparatus is supported.

In one aspect of the embodiment, the at least one wheel assembly may be pivotably coupled to the chassis for pivoting movement relative to the chassis to raise and lower the at least one wheel with respect to the chassis.

In one aspect of the embodiment, the at least one wheel assembly is pivotably coupled to the chassis for pivoting movement in a plane that is, in use, perpendicular with a ground surface on which said radial conveyor apparatus is supported.

In one aspect of the embodiment, the wheel support structure is pivotably coupled to the chassis for pivoting about at least one pivot axis, the at least one wheel being spaced apart from the at least one pivot axis.

In one aspect of the embodiment, one end of the wheel support structure is pivotably coupled to the chassis for pivoting about at least one pivot axis, the other end being coupled to the at least one wheel.

In one aspect of the embodiment, the at least one pivot axis typically includes at least one axis that is, in use, perpendicular with a ground surface on which the radial conveyor apparatus is supported.

In one aspect of the embodiment, the at least one pivot axis may include at least one axis that is, in use, parallel with a ground surface on which the radial conveyor apparatus is supported.

In one aspect of the embodiment, the wheel support structure comprises at least one extendible support member that is operable to raise and lower the at least one wheel with respect to the chassis.

In one aspect of the embodiment, the at least one wheel assembly is pivotably coupled to the chassis for pivoting movement between the deployed and non-deployed states about an axis that is, in use, perpendicular with a ground surface on which the radial conveyor apparatus is supported, and the wheel support structure is configured so that extension and retraction of the extendible support member causes the wheel assembly to pivot with respect to the chassis.

In one aspect of the embodiment, the at least one extendible support member is coupled between the chassis and the at least one wheel.

In one aspect of the embodiment, the at least one extendible support member has one end pivotably coupled to the chassis.

In one aspect of the embodiment, the at least one extendible support member comprises a powered actuator for effecting extension and retraction of the at least one extendible support member.

In one aspect of the embodiment, the powered actuator comprises a hydraulic ram.

In one aspect of the embodiment, the at least one extendible support member may include a strut coupled to the actuator.

In one aspect of the embodiment, the actuator may be pivotably coupled to the strut.

In one aspect of the embodiment, the actuator may be pivotably coupled to the chassis.

In one aspect of the embodiment, the strut may be coupled to the at least one wheel.

In one aspect of the embodiment, the wheel support structure comprises a single extendible support member.

In one aspect of the embodiment, the wheel support structure comprises a frame or linkage, the at least one extendible support member being part of the frame or linkage.

In one aspect of the embodiment, the frame or linkage may comprise an upper support member and a lower support member, one of the upper or lower support members comprising the extendible support member, the other of the upper of lower support members being of fixed length.

In one aspect of the embodiment, the at least one wheel assembly is coupled to a side of the chassis.

In one aspect of the embodiment, a respective one of the at least one wheel assemblies is provided at each side of the chassis.

In one aspect of the embodiment, the apparatus may further include at least one jack operable into and out of a ground-engaging state in which it supports, in use, the chassis on a ground surface.

In one aspect of the embodiment, a respective jack is provided at each side of the chassis.

Further advantageous aspects of the invention will be apparent to those ordinarily skilled in the art upon review of the following description of a specific embodiment and with reference to the accompanying drawings.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

Before describing in detail exemplary embodiments that are in accordance with the disclosure, it is noted that the components have been represented where appropriate by conventional symbols in drawings, showing only those specific details that are pertinent to understanding the embodiments of the disclosure so as not to obscure the disclosure with details that will be readily apparent to those of ordinary skill in the art having the benefit of the descriptions herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Referring in particular to FIGS. 1, 1A, 2 and 2A, there is shown a radial conveyor apparatus 10 embodying the invention. The conveyor apparatus 10 is of a general type commonly referred to as "radial conveyors". The conveyor apparatus 10 comprises a conveyor 12, which is typically but not necessarily an extendible conveyor. The conveyor 12 is supported by a wheeled support structure 14. In preferred embodiments, the support structure 14 comprises a chassis 16 and a conveyor support 18 extending between the chassis 16 and the conveyor 12 to support the conveyor 12 with respect to the chassis 16. The conveyor support 18 is preferably extendable in order to adjust the position of the conveyor 12 with respect to the chassis 16, in particular to raise or lower the height of the conveyor 12.

The conveyor 12 has a feed end 20 and a discharge end 22. A hopper 24 may be provided at the feed end 20 for loading material (not shown) onto the conveyor 12. In use, the conveyor 12 receives material at the feed end 20 and conveys the material to the discharge end 22 to be discharged to a desired location, e.g. a stockpile or a material processing apparatus (not shown).

The feed end 20 of the conveyor 12 is pivotably coupled to the chassis 16 such that the discharge end 22 is raised or lowered as the conveyor 12 pivots with respect to the chassis 16. Typically, the conveyor 18 is coupled to the chassis 16 at a first end 17 of the chassis 16. The pitch of the conveyor 12 with respect to the chassis 16 is determined by the length of the conveyor support 18, which is preferably extendible/retractable to hold the conveyor 16 at any one of a plurality of different pitches thereby raising or lowering the height of the discharge end 22.

The conveyor support 18 has one end pivotably coupled to the chassis 16, the other end pivotably coupled to the conveyor 12 and is extendible in the end-to-end direction to allow the conveyor 12 to pivot with respect to the chassis 16. The conveyor support 18 is lockable in any one of a plurality of states of relative extension/retraction in order to support the conveyor 12 at a desired pitch with respect to the chassis 16. In the illustrated embodiment the conveyor support 18 is coupled to the chassis 16 at a second end 19 of the chassis 16 opposite the end 17 at which the conveyor 18 is coupled to the chassis. Alternatively, the conveyor support 18 may be coupled to the chassis 16 at any other location spaced apart (along the longitudinal axis of the chassis) from the location at which the conveyor 18 is coupled to the chassis 16. In the illustrated embodiment the conveyor support 18 is coupled to the conveyor 12 at a location between the feed and discharge ends 20, 22. Alternatively, the conveyor support 18 may be coupled to the conveyor 12 at any other location spaced apart (along the longitudinal axis of the conveyor) from the feed end 20 of the conveyor 12. The conveyor support 18 may take any suitable form, for example comprising a frame (as illustrated) and/or one or more support members. Conveniently, the conveyor support 18 is telescopically extendible.

The conveyor 12 may be extendible/retractable by virtue of comprising at least one foldable conveyor portion. In the illustrated embodiment, the conveyor 12 has a base conveyor portion 12A (which includes the feed end 20) hinged to a foldable conveyor portion 12B. The foldable portion 12B can be folded between a deployed state (FIG. 1A) for use and a folded state (FIG. 2A) for storage and transport. Any conventional folding mechanism (e.g. comprising hydraulic ram(s) coupled to a linkage) may be provided to effect folding and unfolding of the foldable portion 12B. In this example, the conveyor support 18 is coupled to the conveyor 12 at the end of the base portion 12A opposite the feed end 20. In alternative embodiments the conveyor 12 may be telescopically extendible.

The chassis 16 carries a first set of one or more ground-engaging wheel assemblies, typically being located at the first end 17 of the chassis 16. In the illustrated example, first and second track type wheel assemblies 24A, 24B are provided although in alternative embodiments one or more simple (non-track) wheels may be used.

The chassis 16, and therefore the conveyor 12, is pivotable about an in-use vertical axis (i.e. an axis that is perpendicular with the ground surface upon which the apparatus 10 is supported). This vertical axis is typically located at the first end 17 of the chassis 16. To this end, in the illustrated embodiment, the first end 17 of the chassis 16 is pivotably coupled to the wheel assemblies 24A, 24B. Hence, the chassis 16 and conveyor 12 are able to pivot relative to the wheel assemblies 24A, 24B about a vertical axis at the first end 17. This pivoting movement may be referred to as radial movement.

First and second multi-mode wheel assemblies 30A, 30B are coupled to the chassis 16, one on either side of the chassis 16 (with respect to the longitudinal axis of the chassis 16). In the illustrated embodiment, each wheel assembly 30A, 30B comprises a pair of wheels rotatable about a common axis. More generally each wheel assembly 30A, 30B comprises one or more wheels (which may optionally be of the track type). The wheel assemblies 30A, 30B are spaced apart from the wheel assemblies 24A, 24B along the longitudinal axis of the chassis 16. Conveniently, the wheel assemblies 30A, 30B are coupled to the chassis 16 at its second end 19. The wheel assemblies 30A, 30B facilitate the radial movement of the chassis 16 as is described in more detail hereinafter. The wheel assemblies 30A, 30B are preferably provided in a manner such that they mirror each other, or are at least capable of mirroring each other, with respect to the longitudinal axis of the chassis 16. Conveniently, the wheel assemblies 30A, 30B are the same as each other (other than to the extent that they may in some respects be mirror images of each other to account for their location on opposite sides of the chassis 16). Accordingly any descriptions herein of either one of the wheel assemblies 30A, 30B applies to the other. Moreover, while it is preferred to provide a respective one of the wheel assemblies 30A, 30B on each side of the chassis 16, it is possible in alternative embodiments to provide a wheel assembly 30A, 30B on only one side.

Figures 1A, 1B:
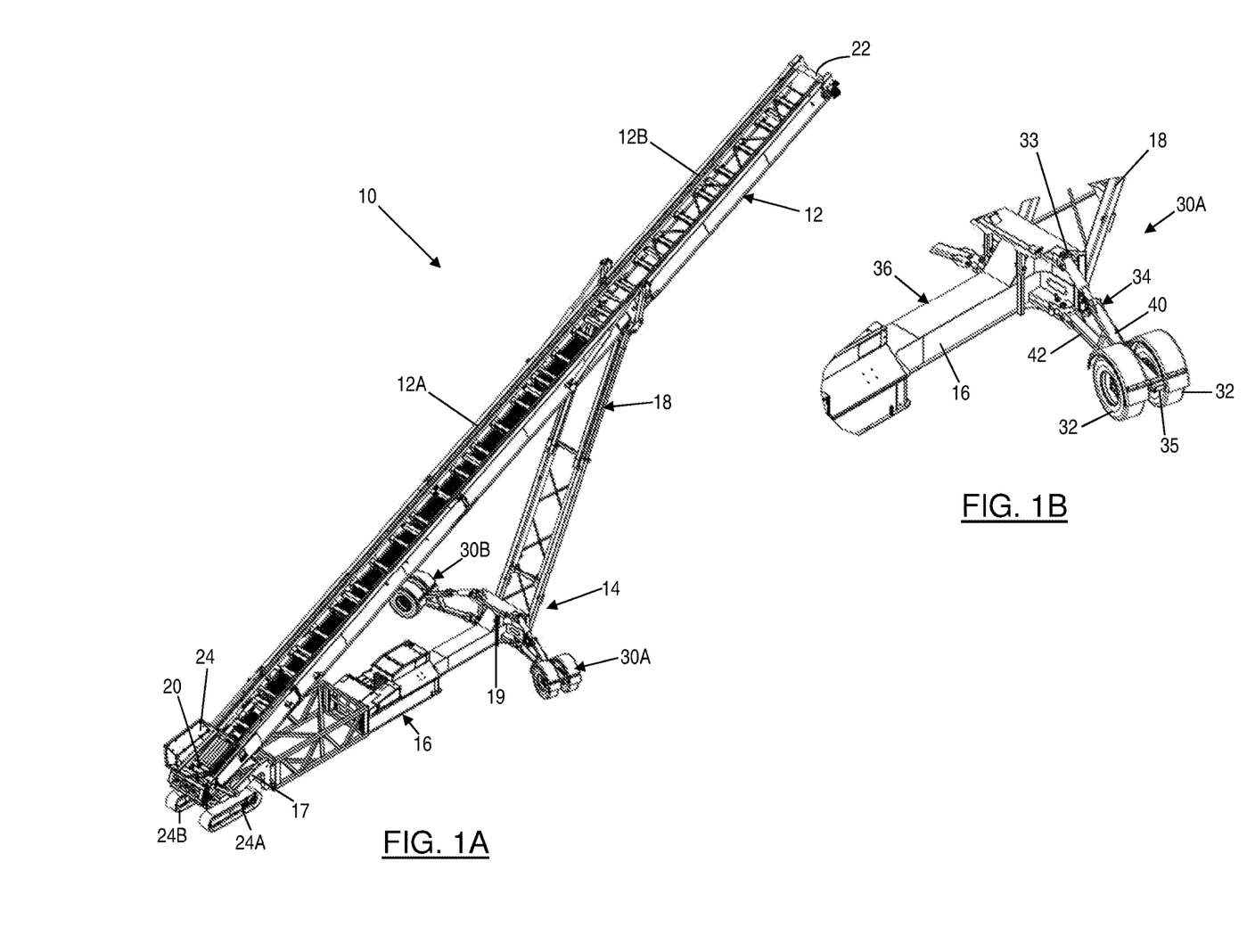
FIG. 1A is a perspective view of a radial conveyor apparatus embodying the invention, the apparatus being shown in a use mode.
FIG. 1B is an enlarged view of a multi-mode wheel assembly being part of the apparatus of FIG. 1A and being shown in a radial mode.
Figures 2A, 2B:
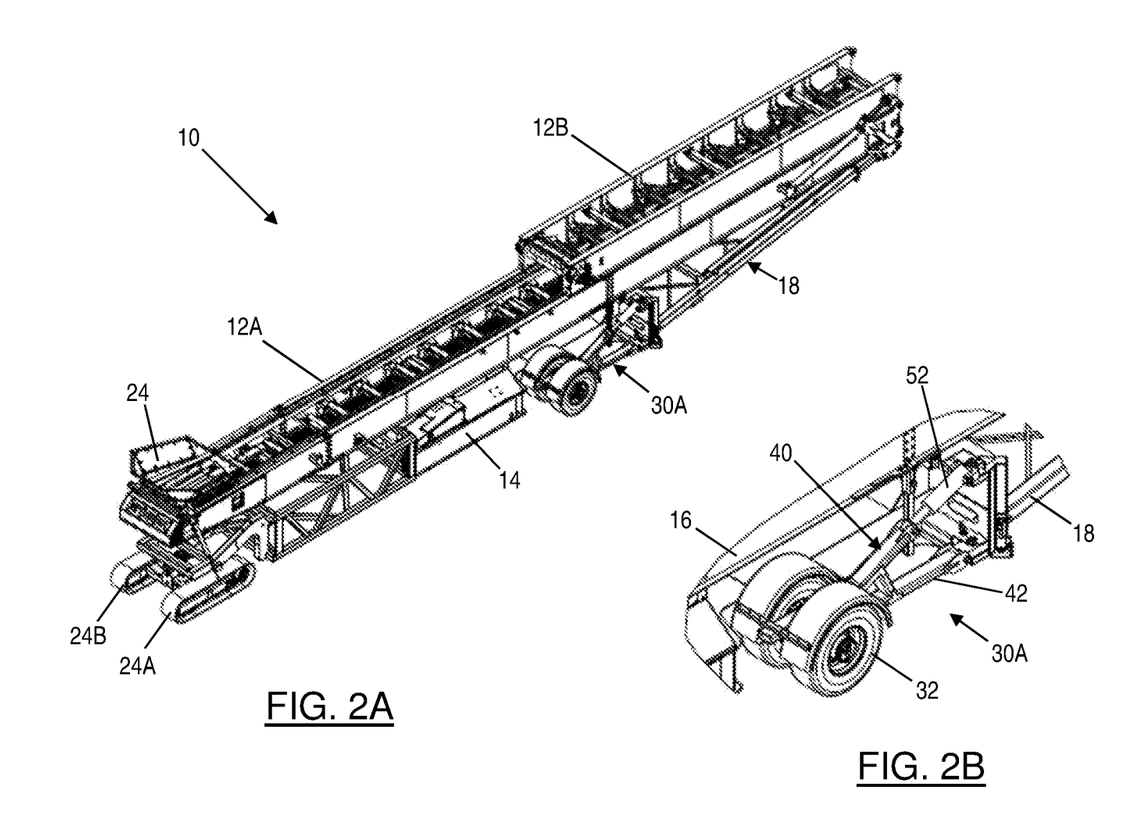
FIG. 2A is a perspective view of the apparatus of FIG. 1 shown in a transport mode.
FIG. 2B is an enlarged view of the multi-mode wheel assembly shown in a transport mode.

The conveyor apparatus 10 is operable between a use mode (FIG. 1A) and a transport mode (FIG. 2A). In the use mode, the conveyor 12 typically extends obliquely upwards with respect to the longitudinal axis of the chassis 16, with its feed end 20 at a relatively low level (typically at or adjacent chassis-level) and its discharge end 22 at a relatively raised level. The height of the discharge end 22 and the pitch of the conveyor 12 are determined by the conveyor support 18, and can be increased or decreased by changing the length of the conveyor support 18. Where applicable, the conveyor 12 is extended or unfolded in the use mode.

In the transport mode, the conveyor 12 is moved closer to the chassis 16 than when in the use mode, preferably being located on top of the chassis 16 and extending substantially parallel with the longitudinal axis of the chassis 16. Where applicable, the conveyor 12 is retracted or folded in the transport mode.

The wheel assemblies 30A, 30B are each operable between a radial mode (FIGS. 1A and 1B) and a transport mode (FIGS. 2A and 2B). In the radial mode, the wheel assemblies 30A, 30B facilitate the radial movement of the chassis 16. To this end, the rotational axis of each wheel assembly 30A, 30B is radially displaced from the longitudinal axis of the chassis 16. In the transport mode of the wheel assemblies 30A, 30B, the rotational axis of each wheel assembly 30A, 30B is perpendicular with the longitudinal axis of the chassis 16 to facilitate movement of the chassis 16, and therefore of the apparatus 10, in the longitudinal direction. Accordingly, in the transport mode, the apparatus 10 is amenable to being towed or pushed, or even of being driven in cases where it is self-propelled.

To effect the radial and transport modes, the wheel assemblies 30A, 30B are movable with respect to the chassis 16 between a deployed state (FIGS. 1A and 1B) and a non-deployed state (FIGS. 2A and 2B). Preferably, each wheel assembly 30A, 30B is pivotably coupled to the chassis 16 to allow it to pivot between its deployed and non-deployed states about an in-use vertical axis.

Each wheel assembly 30A, 30B comprises one or more wheels 32 rotatably mounted on a wheel support structure 34. The wheel support structure 34 is pivotably coupled to the chassis 16 to allow the wheel assembly 30A, 30B to pivot between the deployed and non-deployed states about an in-use vertical axis. Typically, one end 33 of the wheel support structure 34 is coupled to the chassis 16 while the wheel(s) 32 are mounted on its opposite end 35. In the deployed state the wheel support structure 34 projects outwardly away from the chassis 16 (typically extending obliquely to the longitudinal axis of the chassis) to hold the wheel(s) 32 at a location that is laterally spaced apart from the respective side of the chassis 16 (and such that their rotational axis is radially displaced from the longitudinal axis of the chassis 16). In the non-deployed state the wheel support structure 34 is folded alongside the chassis 16 (typically extending parallely or substantially parallely to the longitudinal axis of the chassis) to locate the wheel(s) 32 adjacent the respective side of the chassis 16 such that their rotational axis is perpendicular with the longitudinal axis of the chassis 16. A respective recess 36 may be provided in each side of the chassis 16 for receiving the wheel(s) 32 in the non-deployed state. The wheel support structure 34 may be coupled to the chassis 16 at the mouth of the respective recess 36.

In addition to being pivotable between the deployed and non-deployed states, the wheel support structure 34 is also pivotable with respect to the chassis 16 about at least one horizontal axis to allow the wheel(s) 32 to be raised and lowered with respect to the chassis 16. As such the wheel(s) 32 may be said to be height-adjustable with respect to the chassis 16. Raising and lowering the wheel(s) 32 causes the chassis 16 to be lowered and raised, respectively, with respect to the ground surface. Preferably, the wheel assembly 30A, 30B can be raised or lowered with respect to the chassis 16 to adopt any one of a plurality of positions in which the wheel(s) 32 are correspondingly raised or lowered and in which the chassis 16 is correspondingly lowered or raised with respect to the ground surface on which it is supported. In any of these positions the wheel(s) 32 are still ground-engaging and so facilitate transport of the apparatus 10. It is further preferred that the wheel assemblies 30A, 30B can be raised with respect to the chassis 16 to at least one position in which the wheel(s) 32 do not engage the ground (typically such that the lowest level of the wheel(s) 32 is higher than the lowest level of the chassis). Hence, the wheel assembly 30A, 30B can be raised or lowered with respect to the chassis 16 between a ground-engaging state and a non ground-engaging state. It is preferred that, in the ground engaging state, the wheel assembly 30A, 30B can adopt more than one position in which its height differs with respect to the chassis 16 in order that the chassis can be supported by the wheel(s) 32 at more than one height with respect to the ground surface.

In the preferred embodiment the wheel support structure 34 is provided with at least one extendible support member 40 for raising and lowering the wheel assembly 30A, 30B. The arrangement is such that extension or retraction of the support member 40 causes the wheel assembly 30A, 30B to pivot in a vertical plane with respect to the chassis 16. In preferred embodiments, the wheel support structure 34 comprises upper and lower support members 40, 42, each for example comprising a strut, each support member 40, 42 having one end 44, 46 pivotably coupled to the chassis 16 for pivoting about a respective horizontal axis. This allows the wheel assembly 30A, 30B to be raised and lowered as described. The other end 48, 50 of the support member 40, 42 is coupled to the wheel(s) 32. The ends 44, 46 are also pivotably coupled to the chassis 16 for pivoting about a vertical axis to allow movement of the wheel assembly 30A, 30B between the deployed and non-deployed states. The extendible support member 40 comprises a linear actuator 52 (conveniently a hydraulic ram) to effect extension and retraction of the member 40. In the illustrated example, the extendible support member 40 also includes a strut portion 54 to which the actuator 52 is coupled, preferably pivotably. In particular one end (e.g. the butt) of the actuator 52 is pivotably coupled to the chassis 16 the other end (e.g. the extendible end, in this case the piston rod) being coupled to one end of the strut portion 54, the other end of the strut portion 54 being coupled to the wheel(s) 32. The lower support member 42 is of fixed length.

It will be understood that many variations of the wheel support structure 34 are feasible. For example, the extendible support member 40 may be the lower support member rather than the upper support member. Alternatively or in addition, the linear actuator may serve as the extendible support member without being coupled to any strut portion 54. Alternatively or in addition each support member may be extendible. More generally the wheel support structure may comprise any framework or linkage having at least one extendible member that is operable to raise and lower the wheel(s) 32 in the manner described. Preferably the, or each, extendible member is extendible by powered means, e.g. hydraulically or electrically, and so may comprise at least one powered actuator.

Referring now in particular to FIGS. 3 to 8, exemplary operation of the conveyor apparatus 10 is described. Only wheel assembly 30A is shown in FIGS. 3 to 7 but the same description applies to the other wheel assembly 30B.

Figure 3:
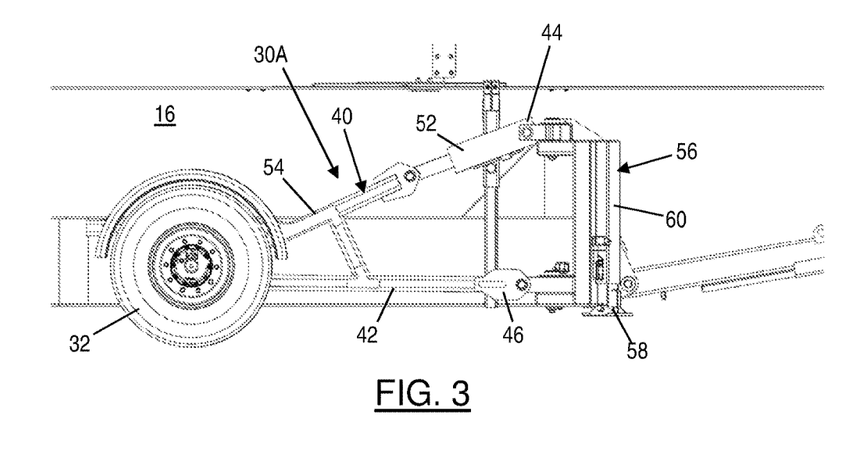
FIG. 3 is a side view of part of the apparatus of FIG. 1A showing the multi-mode wheel assembly in the transport mode in a ground-engaging state and in a relatively raised position.

FIG. 3 shows the apparatus 10 in its transport mode. The wheel assembly 30A is in its transport mode. As such it is in its non-deployed state, extending alongside the chassis 16 such that the rotational axis of the wheels 32 is perpendicular with the chassis 16. The wheels 32 are in a ground-engaging state and so facilitate transport of the apparatus 10 as a road-going vehicle. Typically the apparatus 10 is towed in the transport mode, although it may alternatively be pushed, or include any conventional propulsion system to allow self-propulsion.

Figure 4:
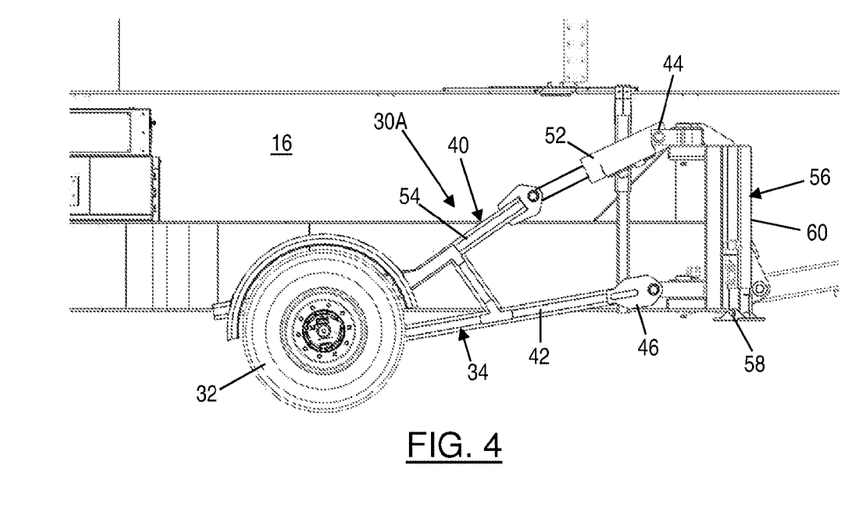
FIG. 4 is a side view of part of the apparatus of FIG. 1A showing the multi-mode wheel assembly in the transport mode and in the ground-engaging state in a relatively lowered position.

Referring to FIG. 4, the apparatus 10 and wheel assembly 30A are still in the transport modes and so the same description applies as provided for FIG. 3. However, in comparison with FIG. 3, the wheel assembly 30A, and therefore the wheels 32, is in a relatively lowered position compared to the relatively raised position of FIG. 3. In each case, the wheels 32 are in a ground engaging state and so, in the arrangement of FIG. 4, the lowered wheel assembly 30A raises the chassis 16 relative to the ground surface in comparison with the arrangement of FIG. 3 which holds the chassis 16 in a relatively lowered position. The different arrangements shown in FIGS. 3 and 4 are effected by controlling the extension of the extendible support 40, which in this case involves extending or retracting the actuator 52, to pivot the wheel assembly 30A about its ends 44, 46 in a vertical plane.

By controlling the height position of the wheels 32 (for example as illustrated in FIGS. 3 and 4), the ground clearance of the chassis 16 can be adjusted to suit the transport requirements of the conveyor apparatus 10 in the transport mode. It will be understood that the wheel assembly 30A may be operable to adopt any one of a plurality of different height positions (not just the two illustrated in FIGS. 3 and 4) to correspondingly adjust the ground clearance of the chassis 16. Adjusting the ground clearance not only is helpful for negotiating variations in the ground surface, but also for adjusting the overall height of the conveyor apparatus 10, especially in the transport mode where height restrictions may be encountered. The ability to raise and lower the wheels also facilitates moving the wheel assemblies between the deployed and non-deployed states as is described in more detail hereinafter.

Figure 5:
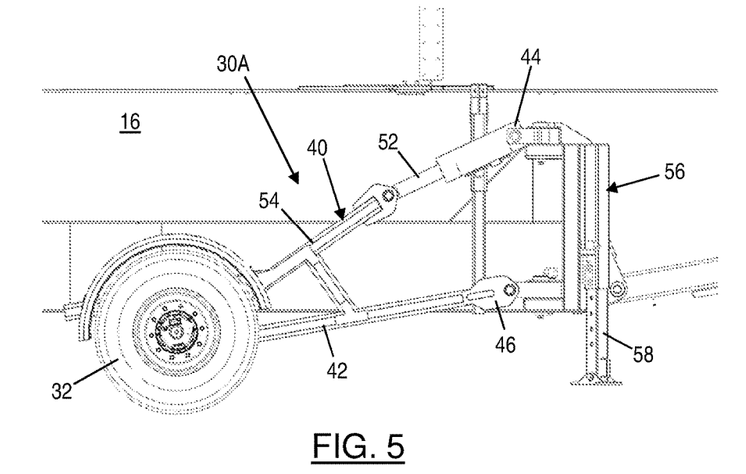
FIG. 5 is a side view of part of the apparatus of FIG. 1A showing the multi-mode wheel assembly in the transport mode and the ground-engaging state, and also illustrating the deployment of a jack.
Figure 6:
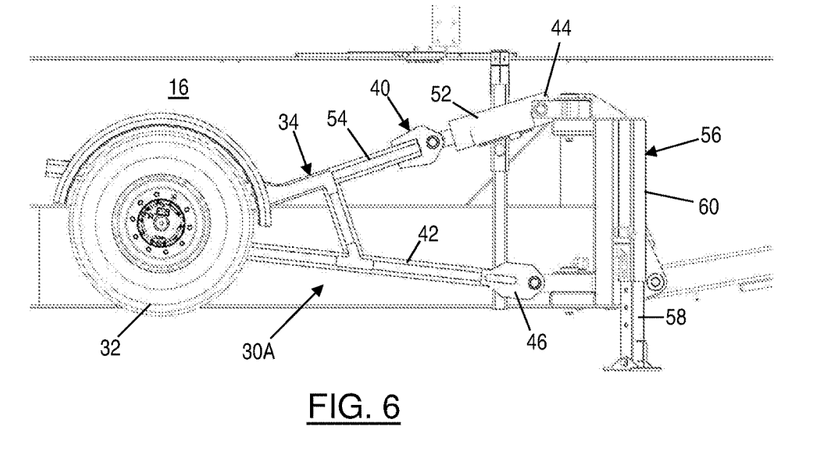
FIG. 6 is a side view of part of the apparatus of FIG. 1A showing the multi-mode wheel assembly in a non-ground engaging state and in a relatively raised position, and showing the jack in a ground engaging state.
Figure 7:
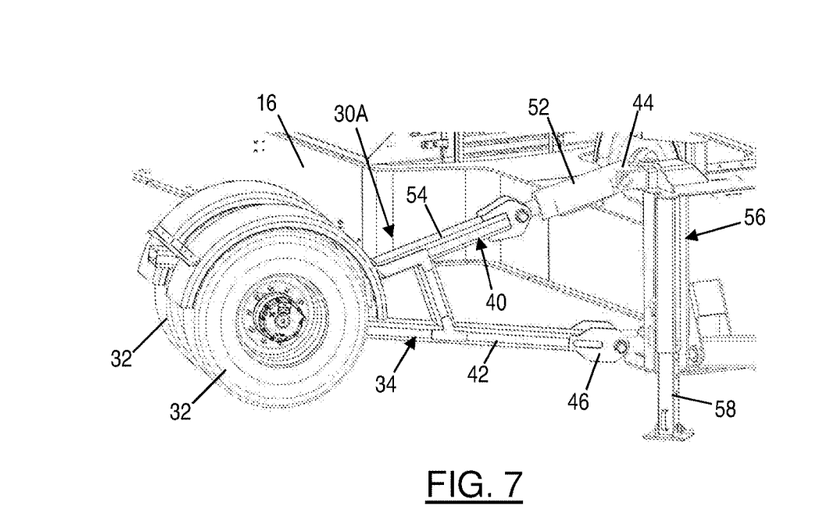
FIG. 7 is a perspective view of the multi-mode wheel assembly in deployment between its transport and radial modes.
Figure 8:
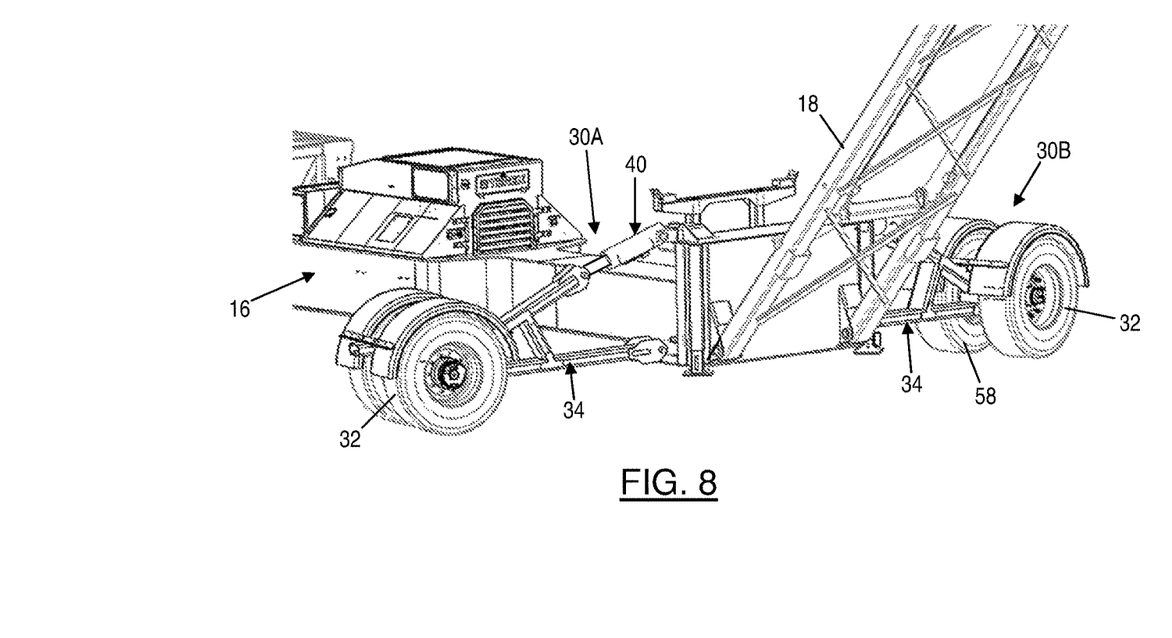
FIG. 8 is a perspective view of the apparatus showing the multi-mode wheel assembly in the radial mode.

FIGS. 5 to 8 illustrated how the wheel assemblies 30A, 30B may be operated from their transport mode to their radial mode. In FIG. 5, the wheel assembly 30A is in its transport mode and the same description applies as is provided for FIGS. 3 and 4. It is preferred that the wheel assembly 30A is in a relatively lowered position in comparison to the position adopted for normal transport (e.g. the position of FIG. 4 rather than the position of FIG. 3). In any event, the wheels 32 are ground-engaging. A jack 56 is coupled to the chassis 16 and is operable to engage with the ground surface to support the chassis 16, and therefore the conveyor apparatus 10, on the ground surface. Preferably a respective jack 56 is provided on each side of the chassis 16, as can be seen in FIG. 8, and the same description may be applied to each jack 56. The jack 56 has a deployable jacking leg 58 that is extendable from a base 60 between a non ground-engaging state (FIG. 5) and a ground-engaging state (FIGS. 6 and 7). The jack 56 is operated from its non ground-engaging state into its ground-engaging state while the wheels 32 are ground engaging (FIG. 5). Then, with the jack 56 in its ground-engaging state, the wheel assembly 30A is operated from its ground-engaging state to its non ground-engaging state by raising the wheels 32 off the ground (FIG. 6). This is effected by retracting the extendable member 40, which in this embodiment involves retracting the actuator 52.

The jack 56 is preferably manually operable although in alternative embodiments it may be power-operated. To hold the jack 56 in its ground-engaging state any suitable locking mechanism may be provided, for example a locking pin and socket arrangement. As illustrated, a plurality of spaced apart locking pin sockets may be provided to allow adjustment of the extension of the leg 58 in the ground-engaging state, which in turn affects the ground clearance of the chassis 16 when supported by the jack 56.

When the chassis 16 is supported by the deployed jacks 56 and the wheel assemblies 30A, 30B are in the non ground-engaging state, the wheel assemblies 30A, 30B may be moved between the transport and radial modes, i.e. between the non-deployed and deployed states. In preferred embodiments, movement of the wheel assemblies 30A, 30B between the deployed and non-deployed states is effected manually by pivoting the assemblies 30A, 30B about the vertical axis at the ends 44, 46. In alternative embodiments, one or more powered actuators (e.g. hydraulic ram(s)) may be provided for this purpose.

FIG. 7 shows the wheel assembly 30A in the deployed state while the jack 56 is in the ground-engaging state. The wheels 32 are still non ground-engaging to facilitate the pivoting movement of the wheel assembly 30A between its deployed and non-deployed states.

With reference in particular to FIG. 8, while the jacks 56 are in the ground-engaging state and the wheel assemblies 30A, 30B in their deployed and non ground-engaging states, the wheel assemblies 30A, 30B are lowered into their ground-engaging state. Then the jacks 56 are operated into their non ground engaging states. The wheel assemblies 30A, 30B are now in their radial mode and the conveyor apparatus 10 is in the use mode. The height of the wheel assemblies 30A, 30B may be adjusted as previously described to obtain the desired ground clearance for the radial mode.

A reverse operation may be implemented to operate the wheel assemblies 30A, 30B from the radial mode to the transport mode, and so to operate the conveyor apparatus 10 from the use mode to the transport mode: starting with the configuration of FIG. 8 (radial mode), the jacks 56 are deployed to the ground-engaging state, after which the wheel assemblies 30A, 30B are raised to the non ground-engaging state. Then the wheel assemblies 30A, 30B are moved to the non-deployed state and lowered into the ground-engaging state, after which the jacks 56 are operated to the non ground-engaging state. The height of the wheel assemblies 30A, 30B may be adjusted as previously described to obtain the desired ground clearance for the transport mode.

It will be apparent from the foregoing that the wheel assemblies 30A, 30B are operable in multiple modes to support transport and radial use of the conveyor apparatus 10 without the requirement for separate wheel sets for use and transport. Moreover, in preferred embodiments, the wheel assemblies are relatively simple and therefore inexpensive. In particular, each wheel assembly 30A, 30B may require only one powered component (the actuator 52).

It will be appreciated by persons skilled in the art that the present embodiments are not limited to what has been particularly shown and described herein above. In addition, unless mention was made above to the contrary, it should be noted that all of the accompanying drawings are not to scale. A variety of modifications and variations are possible in light of the above teachings.

What is claimed is:

1. A radial conveyor apparatus comprising:
a chassis having a longitudinal axis;
a conveyor supported on the chassis;
at least one wheel assembly coupled to the chassis, the or each wheel assembly comprising at least one wheel coupled to a wheel support structure for rotation about a rotational axis,
the at least one wheel assembly being pivotably coupled to the chassis for pivoting movement with respect to the chassis about an axis that is, in use, perpendicular with a ground surface on which the radial conveyor apparatus is supported between a non-deployed state, in which the rotational axis is perpendicular with the longitudinal axis of the chassis, and a deployed state in which the rotational axis is at least one of the group consisting of oblique and parallel with respect to the longitudinal axis; and
the at least one wheel assembly being pivotably coupled to the chassis for pivoting movement relative to the chassis to raise and lower the at least one wheel with respect to the chassis, and including a powered actuator that is operable to cause the wheel assembly to pivot with respect to the chassis to raise and lower the at least one wheel with respect to the chassis,
where the apparatus further includes at least one jack operable into and out of a ground engaging state in which the at least one jack supports the chassis above a ground surface,
and where the apparatus is operable in a use mode, in which the at least one wheel assembly is in the deployed state and the at least one jack is not in the ground engaging state, or in a transport mode, in which the at least one wheel assembly is in the non-deployed state and the at least one jack is not in the ground engaging state, or in a transition mode, in which the at least one jack is in the ground-engaging state to allow the at least one wheel assembly to pivot between the deployed state and the non-deployed state,
and where in the transport mode of the at least one wheel of the at least one wheel assembly is ground-engaging so that the at least one wheel assembly supports the chassis above a ground surface, the powered actuator being operable to pivot the at least one wheel assembly with respect to the chassis to adjust a clearance height between the chassis and the ground surface.

2. The apparatus of claim 1, wherein the at least one wheel assembly is pivotably coupled to the chassis for pivoting movement in a plane that is, in use, perpendicular with a ground surface on which the radial conveyor apparatus is supported.

3. The apparatus of claim 1, wherein the wheel support structure is pivotably coupled to the chassis for pivoting about at least one pivot axis, the at least one wheel being spaced apart from the at least one pivot axis.

4. The apparatus of claim 1, wherein one end of the wheel support structure is pivotably coupled to the chassis for pivoting about at least one pivot axis, the other end being coupled to the at least one wheel.

5. The apparatus of claim 3, wherein the at least one pivot axis includes at least one axis that is, in use, parallel with a ground surface on which the radial conveyor apparatus is supported.

6. The apparatus of claim 1, wherein the wheel support structure comprises at least one extendible support member that is operable to raise and lower the at least one wheel with respect to the chassis.

7. The apparatus of claim 6, wherein the at least one wheel assembly is pivotably coupled to the chassis for pivoting movement between the deployed and non-deployed states about an axis that is, in-use, perpendicular with a ground surface on which the radial conveyor apparatus is supported, and the wheel support structure is configured so that extension and retraction of the extendible support member causes the wheel assembly to pivot with respect to the chassis.

8. The apparatus of claim 6, wherein the at least one extendible support member is coupled between the chassis and the at least one wheel.

9. The apparatus of claim 8, wherein the at least one extendible support member has one end pivotably coupled to the chassis.

10. The apparatus of claim 6, wherein the at least one extendible support member comprises a powered actuator for effecting extension and retraction of the at least one extendible support member.

11. The apparatus of claim 10, wherein the at least one extendible support member further includes a strut coupled to the actuator.

12. The apparatus of claim 11, wherein the actuator is pivotably coupled to the strut.

13. The apparatus of claim 11, wherein the actuator is pivotably coupled to the chassis.

14. The apparatus as claimed in claim 11, wherein the strut is coupled to the at least one wheel.

15. The apparatus of claim 6, wherein the wheel support structure comprises a single extendible support member.

16. The apparatus of claim 6, wherein the wheel support structure comprises a frame or linkage, the at least one extendible support member being part of the frame or linkage.

17. The apparatus of claim 16, wherein the frame or linkage comprises an upper support member and a lower support member, one of the upper or lower support members comprising the extendible support member, the other of the upper of lower support members being of fixed length.

18. The apparatus of claim 1, wherein the at least one wheel assembly is coupled to a side of the chassis.

19. The apparatus of claim 1, wherein a respective one of the at least one wheel assemblies is provided at each side of the chassis.

20. The apparatus of claim 1, wherein when the at least one wheel assembly is in the non-deployed state, the at least one wheel assembly is folded alongside the chassis to locate the at least one wheel adjacent a side of the chassis.

21. A radial conveyor apparatus comprising:
a chassis having a longitudinal axis;
a conveyor supported on the chassis;
at least one wheel assembly coupled to the chassis, the or each wheel assembly comprising at least one wheel coupled to a wheel support structure for rotation about a rotational axis,
the at least one wheel assembly being pivotably coupled to the chassis for pivoting movement with respect to the chassis about an axis that is, in-use, perpendicular with a ground surface on which the radial conveyor apparatus is supported between a non-deployed state, in which the rotational axis is perpendicular with the longitudinal axis of the chassis, and a deployed state in which the rotational axis is oblique or parallel with respect to the longitudinal axis, the chassis being shaped to define a recess for receiving the at least one wheel when the at least one wheel assembly is in the non-deployed state; and
the at least one wheel assembly being pivotably coupled to the chassis for pivoting movement relative to the chassis to raise and lower the at least one wheel with respect to the chassis, and including a powered actuator that is operable to cause the wheel assembly to pivot with respect to the chassis to raise and lower the at least one wheel with respect to the chassis,
and where, when the at least one wheel assembly is in the non-deployed state, the at least one wheel assembly is folded alongside the chassis to locate the at least one wheel adjacent a side of the chassis.

* * * * *